US009471526B2

United States Patent
Lin et al.

(10) Patent No.: US 9,471,526 B2
(45) Date of Patent: *Oct. 18, 2016

(54) BRIDGE BETWEEN TWO DIFFERENT CONTROLLERS FOR TRANSFERRING DATA BETWEEN HOST AND STORAGE DEVICE

(71) Applicant: Marvell World Trade LTD., St. Michael (BB)

(72) Inventors: Chun-Lun Lin, Santa Clara, CA (US); Kanting Tsai, San Jose, CA (US); Dishi Lai, San Jose, CA (US); Hsi-Cheng Chu, San Jose, CA (US)

(73) Assignee: Marvell World Trade LTD., St. Michael (BB)

( * ) Notice: Subject to any disclaimer, the term of this patent is extended or adjusted under 35 U.S.C. 154(b) by 395 days.

This patent is subject to a terminal disclaimer.

(21) Appl. No.: 14/090,182

(22) Filed: Nov. 26, 2013

(65) Prior Publication Data

US 2014/0082226 A1    Mar. 20, 2014

Related U.S. Application Data

(63) Continuation of application No. 13/276,371, filed on Oct. 19, 2011, now Pat. No. 8,595,406.

(60) Provisional application No. 61/405,444, filed on Oct. 21, 2010.

(51) Int. Cl.
G06F 13/40 (2006.01)
G06F 3/06 (2006.01)

(52) U.S. Cl.
CPC ........... *G06F 13/4031* (2013.01); *G06F 3/061* (2013.01); *G06F 3/0613* (2013.01); *G06F 3/0655* (2013.01); *G06F 3/0659* (2013.01); *G06F 3/0661* (2013.01);
(Continued)

(58) Field of Classification Search
CPC ........ G06F 13/12; G06F 13/14; G06F 13/16; G06F 13/1605; G06F 13/161; G06F 13/1668; G06F 13/40; G06F 13/4004; G06F 13/4027; G06F 13/4031; G06F 13/126; G06F 13/4009; G06F 3/0655; G06F 3/0659; G06F 3/061; G06F 3/0613; G06F 3/0661; G06F 3/0671; G06F 3/0658
See application file for complete search history.

(56) References Cited

U.S. PATENT DOCUMENTS

| 5,592,682 | A | * | 1/1997 | Chejlava, Jr. | ......... G06F 3/0601 710/3 |
| 7,096,307 | B2 | * | 8/2006 | Moyer | ................ G06F 13/4059 710/107 |
| 7,296,109 | B1 | * | 11/2007 | Zhang | .................. G06F 13/364 370/229 |

(Continued)

OTHER PUBLICATIONS

The Notification of Transmittal of the International Search Report and the Written Opinion of the International Searching Authority for corresponding International Application No. PCT/US2011/056850.

*Primary Examiner* — Thomas J Cleary

(57) ABSTRACT

A system including a controller and a bridge module. The controller is configured to (i) communicate with a host via a first interface, and (ii) communicate with a storage device via a second interface. The second interface is separate from the first interface. The bridge module is configured to allow the controller to transfer data between the storage device and the host without buffering the data, and to access a memory of the host via the first interface during the transfer.

7 Claims, 6 Drawing Sheets

(52) U.S. Cl.
CPC ...... *G06F 13/4009* (2013.01); *G06F 13/4027* (2013.01); *G06F 3/0658* (2013.01); *G06F 3/0671* (2013.01)

(56) References Cited

U.S. PATENT DOCUMENTS

| | | | |
|---|---|---|---|
| 7,620,747 B1 | 11/2009 | Overby et al. | |
| 2005/0055489 A1* | 3/2005 | Elliott | G06F 5/10 710/310 |
| 2005/0198601 A1* | 9/2005 | Kuang | G06F 17/5022 716/108 |
| 2006/0004935 A1* | 1/2006 | Seto | G06F 13/4027 710/62 |
| 2006/0050477 A1* | 3/2006 | Wu | G06F 1/1632 361/679.32 |
| 2006/0174049 A1* | 8/2006 | Lin | G06F 3/0607 710/308 |
| 2007/0005838 A1 | 1/2007 | Chang et al. | |
| 2009/0113454 A1* | 4/2009 | Zhang | G06F 13/4027 719/321 |
| 2009/0190258 A1* | 7/2009 | Martin | G11B 23/288 360/133 |
| 2010/0122021 A1* | 5/2010 | Lee | G06F 3/0613 711/103 |
| 2010/0185808 A1 | 7/2010 | Yu et al. | |
| 2010/0190373 A1 | 7/2010 | Yeh | |
| 2011/0119686 A1* | 5/2011 | Chen | G06F 3/0607 719/326 |
| 2011/0138116 A1* | 6/2011 | Lipinski | G06F 3/0607 711/103 |

* cited by examiner

BRIDGE BETWEEN TWO DIFFERENT CONTROLLERS FOR TRANSFERRING DATA BETWEEN HOST AND STORAGE DEVICE

CROSS-REFERENCE TO RELATED APPLICATIONS

This is a continuation of U.S. patent application Ser. No. 13/276,371 filed Oct. 19, 2011 (now U.S. Pat. No. 8,595,406 Issued Nov. 26, 2013) which claims the benefit of U.S. Provisional Application No. 61/405,444, filed on Oct. 21, 2010. The disclosure of the above application is incorporated herein by reference in its entirety.

FIELD

The present disclosure relates generally to data storage systems and more particularly to a Universal Serial Bus (USB) to Serial Advanced Technology Attachment (SATA) high-speed bridge for storage devices.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Referring now to FIG. 1, a data storage system 10 includes a storage device 12 and a host 14. The storage device 12 includes a disk controller 16 and a disk drive 18. The disk drive 18 may include a conventional disk drive that stores data on a magnetic medium, a solid-state disk that stores data on a semiconductor memory (e.g., a flash memory), or an optical disk drive that stores data on an optical disc.

The host 14 may include a laptop computer, a personal computer, or any other type of computing device. The storage device 12 may communicate with the host 14 via a Universal Serial Bus (USB) interface. Accordingly, the disk controller 16 may include a USB interface to communicate with the host 12. The disk controller 16 may also include a Serial Advanced Technology Attachment (SATA) interface to communicate with the disk drive 18.

SUMMARY

A system includes a first controller configured to communicate with a host via a first interface; a second controller configured to communicate with a storage device via a second interface, where the second interface is different than the first interface; and a bridge module configured to allow the second controller to transfer data between the storage device and the host and to allow the second controller to access memory of the host via the first interface during the transfer.

In another feature, the bridge module is configured to provide a path for the transfer between the storage device and the host, where the path includes the first controller, the bridge module, and the second controller, and where the path excludes a buffer to store the data.

In another feature, the bridge module is configured to allow the second controller to convert an incoming command from the host while the transfer is in progress.

In another feature, the bridge module is configured return to the host a status of the transfer by interpreting information received from the second controller about the transfer.

In another feature, the first interface is a Universal Serial Bus (USB) interface, and the second interface is a Serial Advanced Technology Attachment (SATA) interface.

In another feature, the bridge module is configured to convert a first command received from the host to a second command, where the first command is compliant with the first interface, and where the second command is compliant with the second interface; and to transfer the second command to the second interface.

In another feature, the bridge module includes a bridge interface module configured to receive a request from the second controller for a data path providing access to the memory of the host. The bridge module includes an arbitration module configured to provide, based on the request, the data path to the second controller to transfer the data between the storage device and the memory of the host. The data path excludes a buffer to store the data. The bridge interface module allows the second controller to transfer the data between the storage device and the memory of the host via the data path.

In still other features, a system-on-chip (SOC) includes a Universal Serial Bus (USB) controller configured to interface a storage controller of a storage device to a host via a USB interface, and a Serial Advanced Technology Attachment (SATA) controller configured to interface the storage controller to the storage device via a SATA interface. The SOC further includes a command handling module configured to convert a USB command received by the USB controller from the host to a SATA command, and to output the SATA command to the SATA controller. The SATA controller is configured to generate a request for a data path for access to a memory of the host to transfer data between the storage device and the memory of the host according to the SATA command. The data path is a path between the memory and the storage device. The SOC further includes a data handling module configured to receive the request from the SATA controller, and to provide the data path to the SATA controller to transfer the data between the storage device and the memory of the host. The SATA controller is configured to transfer the data between the storage device and the memory of the host according to the SATA command.

In another feature, the SOC further includes a status handling module configured to receive and interpret command completion information from the SATA controller; to generate, based on the command completion, a status of the transfer by determining whether the transfer is completed without error; and to send the status of the transfer to the host via the USB controller.

In still other features, a method includes communicating with a host via a first interface of a first controller; communicating with a storage device via a second interface of a second controller, where the second interface is different than the first interface; allowing the second controller to transfer data between the storage device and the host; and allowing the second controller to access memory of the host via the first interface during the transfer.

In another feature, the method further includes providing a path for the transfer between the storage device and the host, where the path includes the first controller and the second controller, and where the path excludes a buffer to store the data.

In another feature, the method further includes converting an incoming command from the host while the transfer is in progress.

In another feature, the method further includes returning to the host a status of the transfer by interpreting information received from the second controller about the transfer.

In another feature, in the method, the first interface is a Universal Serial Bus (USB) interface, and the second interface is a Serial Advanced Technology Attachment (SATA) interface.

In another feature, the method further includes converting a first command received from the host to a second command, where the first command is compliant with the first interface, and where the second command is compliant with the second interface; and transferring the second command to the second interface.

In another feature, the method further includes receiving a request from the second controller for a data path providing access to the memory of the host; providing, based on the request, the data path to the second controller to transfer the data between the storage device and the memory of the host, where the data path excludes a buffer to store the data; and allowing the second controller to transfer the data between the storage device and the memory of the host via the data path.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1:
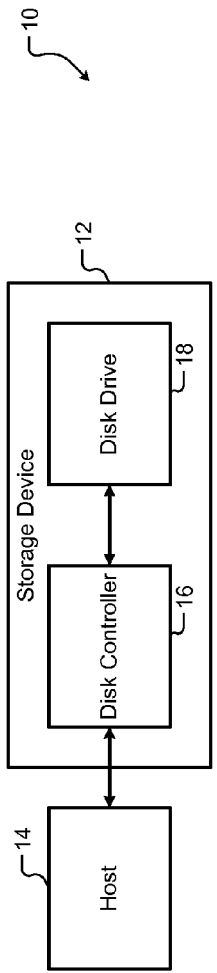
FIG. 1 is a functional block diagram of a data storage system according to the prior art.
Figure 2:
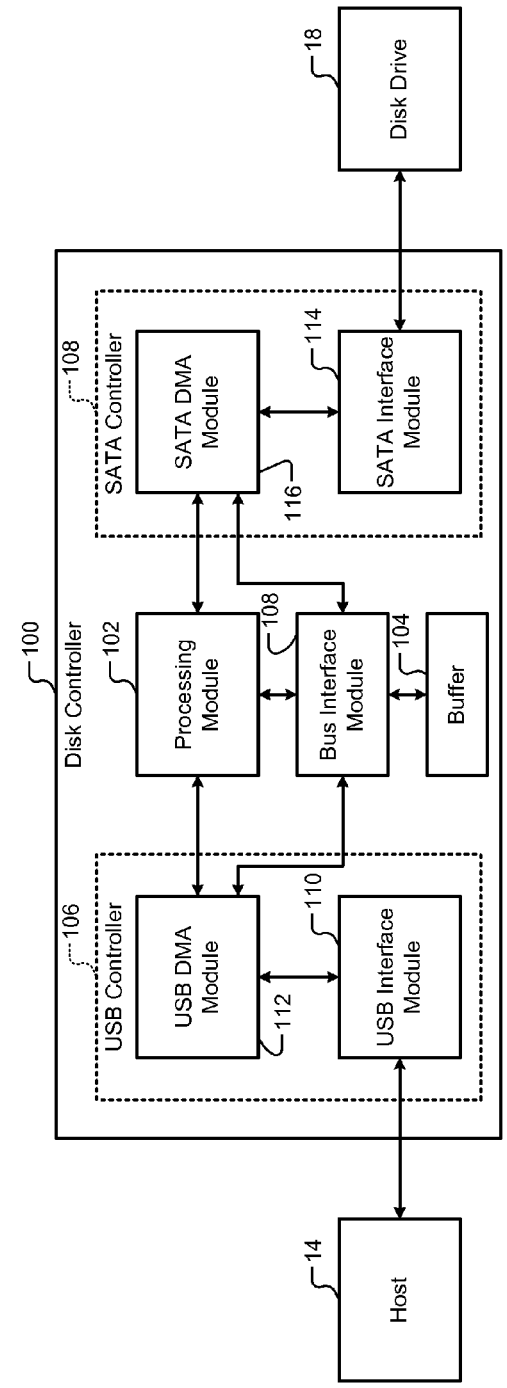
FIG. 2 is a functional block diagram of a disk controller that uses a buffer when transferring data between a host and a disk drive during read/write operations.

Referring now to FIG. 2, an example of a disk controller is shown. A disk controller 100 includes a processing module 102, a bus interface module 107, a buffer 104, a Universal Serial Bus (USB) controller 106, and a Serial Advanced Technology Attachment (SATA) controller 108. The USB controller 106 includes a USB interface module 110 that interfaces with the host 14 and a USB direct memory access (DMA) module 112 that communicates with the USB interface module 110, the processing module 102, and the buffer 104. The SATA controller 108 includes a SATA interface module 114 that interfaces with the disk drive 18 and a SATA DMA module 116 that communicates with the SATA interface module 114, the processing module 102, and the buffer 104. The bus interface module 107 communicates with the USB DMA module 112, the SATA DMA module 116, the processing module 102, and the buffer 104. The bus interface module 107 provides the USB DMA module 112 and the SATA DMA module 116 a DMA path to the buffer 104.

When the host 14 issues a write command to write data on the disk drive 18, the USB DMA module 112 receives the data from the host 14 via the USB interface module 110 and stores the data in the buffer 104. The SATA DMA module 116 retrieves the data from the buffer 104 and forwards the data to the SATA interface module 114, which writes the data to the disk drive 18.

When the host 14 issues a read command to read data from the disk drive 18, the SATA DMA module 116 receives the data from the disk drive 18 via the SATA interface module 114 and stores the data in the buffer 104. The USB DMA module 112 retrieves the data from the buffer 104 and forwards the data to the USB interface module 110, which outputs the data to the host 14.

Buffering data during read/write operations can decrease the rate at which data is transferred between the USB interface module 110 and the SATA interface module 114. Consequently, performance of high-speed interfaces such as USB 3.0 and SATA 3.0 can degrade despite having data transfer rates of 5 Gigabits per second (Gbps) and 6 Gbps, respectively. Moreover, buffering data during read/write operations generates many interrupts which the processing module 102 has to process and which can increase overhead and downgrade IO performance.

Buffering data during read/write operations can be eliminated by using a high-speed bridge instead of using a buffer between the USB and SATA controllers. As explained below, the bridge may work, for example, with Bulk-only Transport (BOT) and USB Attached SCSI (UAS) protocols of the USB interface and Native Command Queuing (NCQ) protocol of the SATA interface. The bridge determines a command phase, a data phase, and a status phase of data transfer between the USB and SATA controllers based on the BOT and UAS protocols. The command phase includes command conversion. The data phase includes data transfer according to the command. The status phase includes returning status of the command and associated data transfer to the host. The bridge can automatically convert an incoming command from the host. The SATA DMA module can directly receive/transmit data from/to the bridge without using the buffer. After determining that a data transaction is completed, the bridge returns status automatically based on the information received from the SATA controller. The bridge thus improves throughput and optimizes IO performance.

The present disclosure uses USB and SATA interfaces for example only. The teachings of the present disclosure are not limited to USB and SATA interfaces. The teachings of the present disclosure can be applied to other interfaces used to transfer data at high speed between a host and a disk drive.

Figure 3:
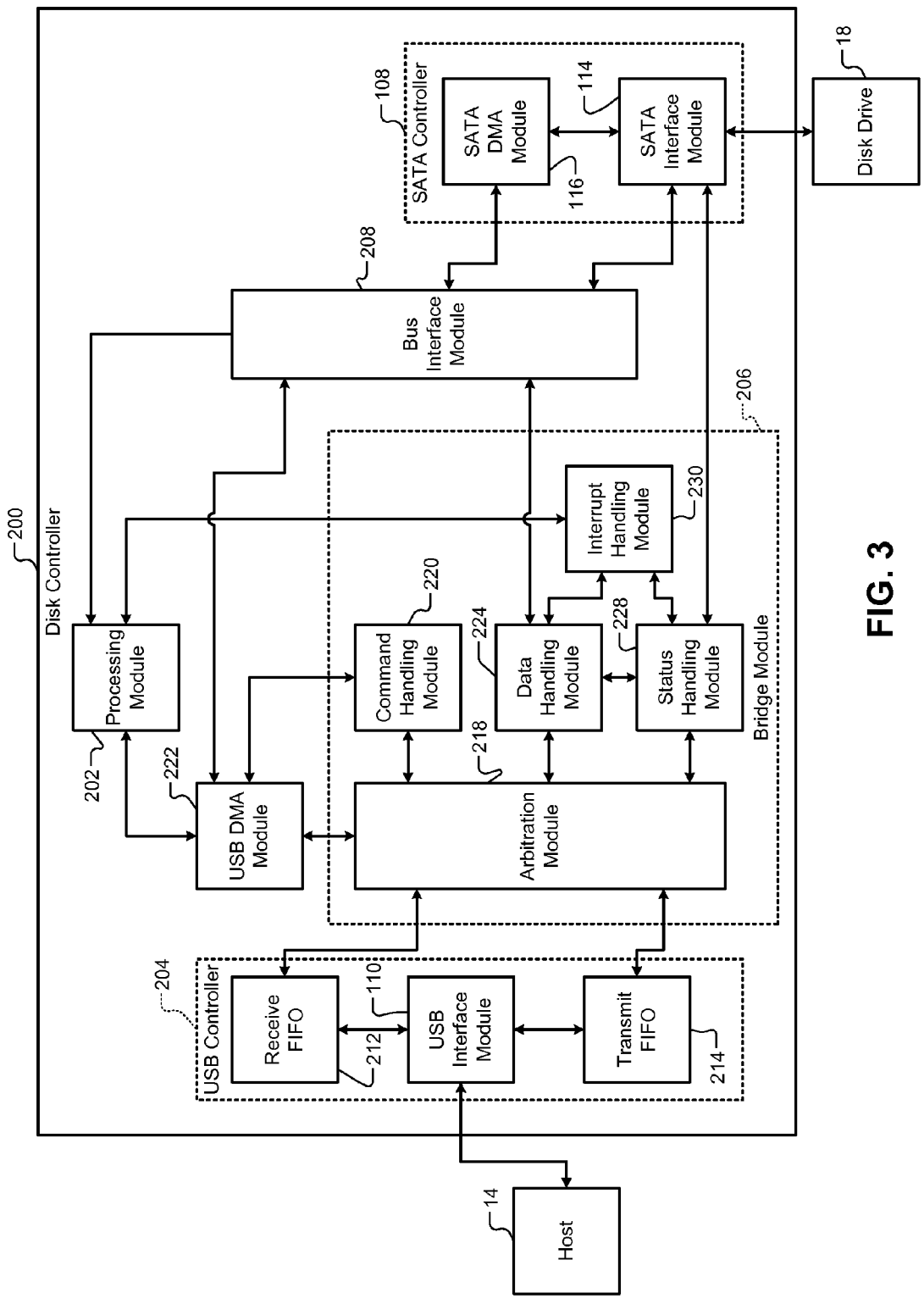
FIG. 3 is a functional block diagram of a disk controller that transfers data directly between a host and a disk drive during read/write operations without using a buffer.

Referring now to FIG. 3, a disk controller 200 includes a processing module 202, a USB controller 204, a bridge module 206, a USB DMA module 222, a bus interface module 208, and a SATA controller 108. The disk controller 200 can be implemented as an integrated circuit (IC) or a system-on-chip (SOC).

As explained below, a command handling module 220 in the bridge module 206 interrupts the processing module 202 when a USB command is received from the host 14. The processing module 202 converts the USB command to a SATA command. When the command is a write command to write data from the host 14 to the disk drive 18, the SATA controller 108 accesses the memory of the host 14 and transfers data from the memory of the host 14 directly to the disk drive 18. When the command is a read command to read data from the disk drive 18, the SATA controller 108 reads data from the disk drive and transfers data from the disk drive 18 directly to the memory of the host 14. The bridge module 206 allows the SATA controller 108 to directly receive/transmit data from/to memory of the host 14 without using the buffer 104 (not shown). The USB controller 204 includes the USB interface module 110, a receive FIFO 212, and a transmit FIFO 214. The USB interface module 110 stores the command received from the host 14 in the receive FIFO 212.

The bridge module 206 includes an arbitration module 218, a command handling module 220, a data handling module 224, a status handling module 228, and an interrupt handling module 230. The bridge module 206 does not include the buffer 104. The command handling module 220 interrupts the processing module 202 when an incoming command is received from the host 14. The processing module 202 converts the command received from the host 14 to a SATA command and outputs the SATA command to the SATA controller 108 via the bus interface module 208. The SATA controller 108 is configured to transfer data according to the SATA command After the SATA controller 108 is configured to transfer data according to the SATA command, the SATA controller 108 sends a request to the data handling module 224 for bus ownership to transfer data directly between the SATA controller 108 and the USB controller 204.

Depending on the type of command (e.g., read or write command), the arbitration module 218 arbitrates bus ownership and data flow between the USB DMA module 222 and the bridge interface module 206. The arbitration module 218 can also perform the arbitration for the command phase, data phase, and status phase automatically without software involvement.

During the read operation, the arbitration module 218 arbitrates bus ownership and data flow from the data handling module 224 to the transmit FIFO 214 to provide a direct data path for the SATA DMA module 116 to transfer the data read from the disk drive 18 directly to the memory of the host 14 via the USB controller 204.

During the write operation, the arbitration module 218 arbitrates bus ownership and data flow from the receive FIFO 212 and the data handling module 224 to provide a direct data path for the SATA DMA module 116 to transfer the data from the memory of the host 14 directly to the disk drive 18 via the USB controller 204.

When each read/write command is completed, the SATA interface module 114 provides information directly to the status handling module 228. The status handling module 228 can interpret the information and send out status automatically without software intervention once the data phase is completed without error.

While only one SATA controller is shown for simplicity of illustration, a plurality of SATA controllers can be interfaced with the bus interface module 208. For each additional SATA controller interfaced with the bus interface module 208, the bridge module 206 can include an additional set of the data handling module 224 and the status handling module 228. The USB DMA module 222 handles DMA for the plurality of SATA controllers and allows each SATA controller to transfer data using a corresponding set of the data handling module 224 and the status handling module 228.

The data handling module 224 provides a direct data path for the SATA DMA module 116 to receive/transmit data directly from/to the memory of the host 14 without storing the data in the buffer 104. The data handling module 224 actively transfers data in and out of the USB controller 204 according to the SATA command. The status handling module 228 also generates status information for a command when the status handling module 228 receives command completion information directly from the module SATA interface module 114 after the data transfer corresponding to the command is completed. If an error occurs at the USB controller 204, the interrupt handling module 230 notifies the processing module 202.

Figure 4:
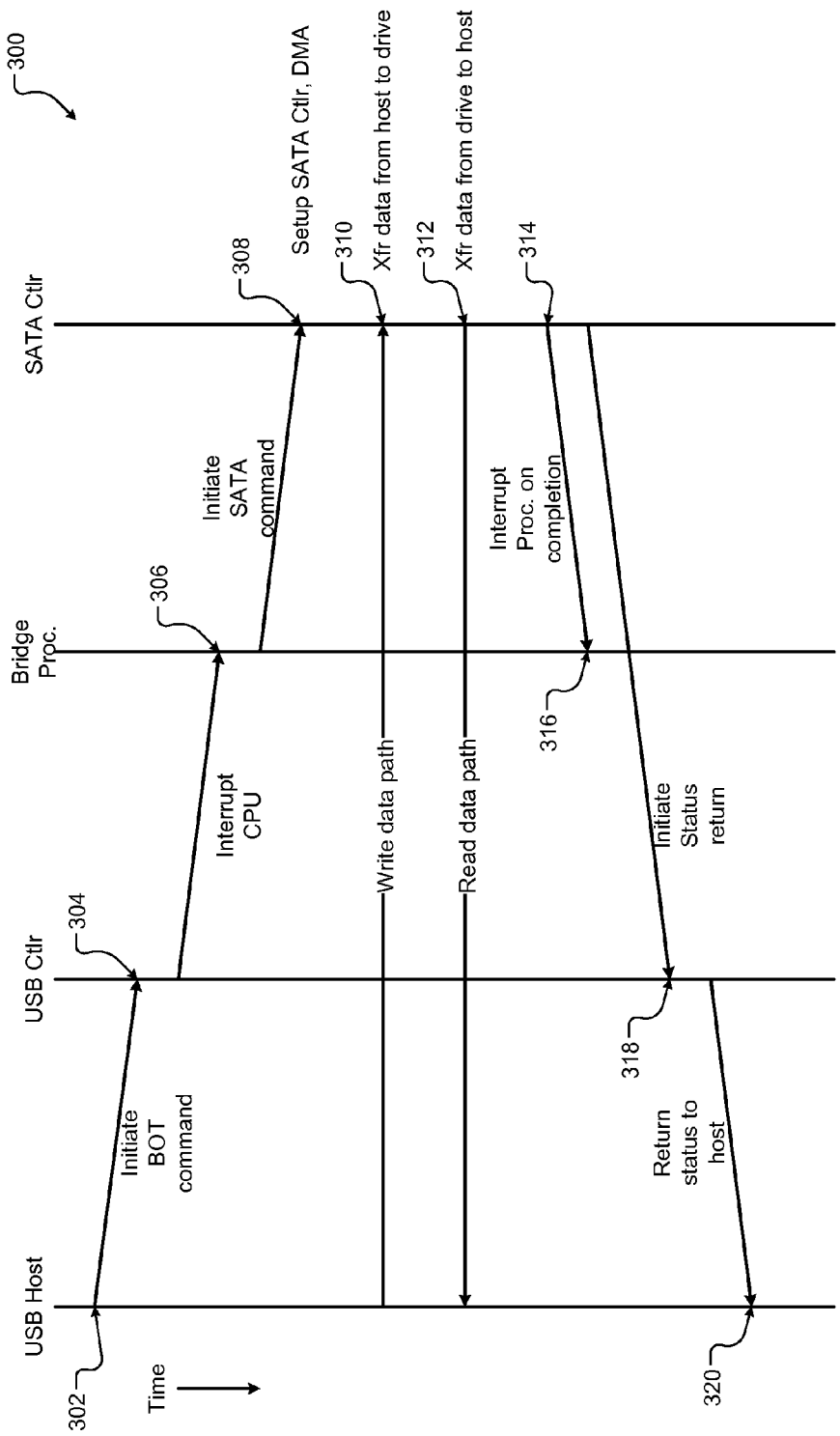
FIG. 4 depicts data flow between a host and a disk drive when the host issues a Universal Serial Bus (USB) Bulk-only Transport (BOT) command.

Referring now to FIG. 4, data flows 300 for a USB Bulk-only Transport (BOT) command are shown. At 302, the host 14 issues a USB BOT command. At 304, the USB controller 204 receives the USB BOT command. At 306, the USB DMA module 222 or the command handling module 220 interrupts the processing module 202. The processing module 202 converts the USB BOT command to a SATA command and sends the SATA command to the SATA controller 108. At 308, the SATA controller 108 receives the SATA command. The SATA controller 108 prepares to transfer data according to the SATA command.

At 310, the SATA controller 108 transfers data directly from the host 14 to the disk drive 18 if the USB command is a write command. At 312, the SATA controller 108 transfers data directly from the disk drive 18 to the host 14 if the USB command is a read command.

At 314, the SATA controller 108 interrupts the processing module 202 when the data transfer is completed. At 318, at the same time, the SATA interface module 114 sends information directly to the status handling module 228. The status handling module 228 interprets the information and generates status without involvement of the processing module 202. At 320, the host 14 receives the status information.

Figure 5:
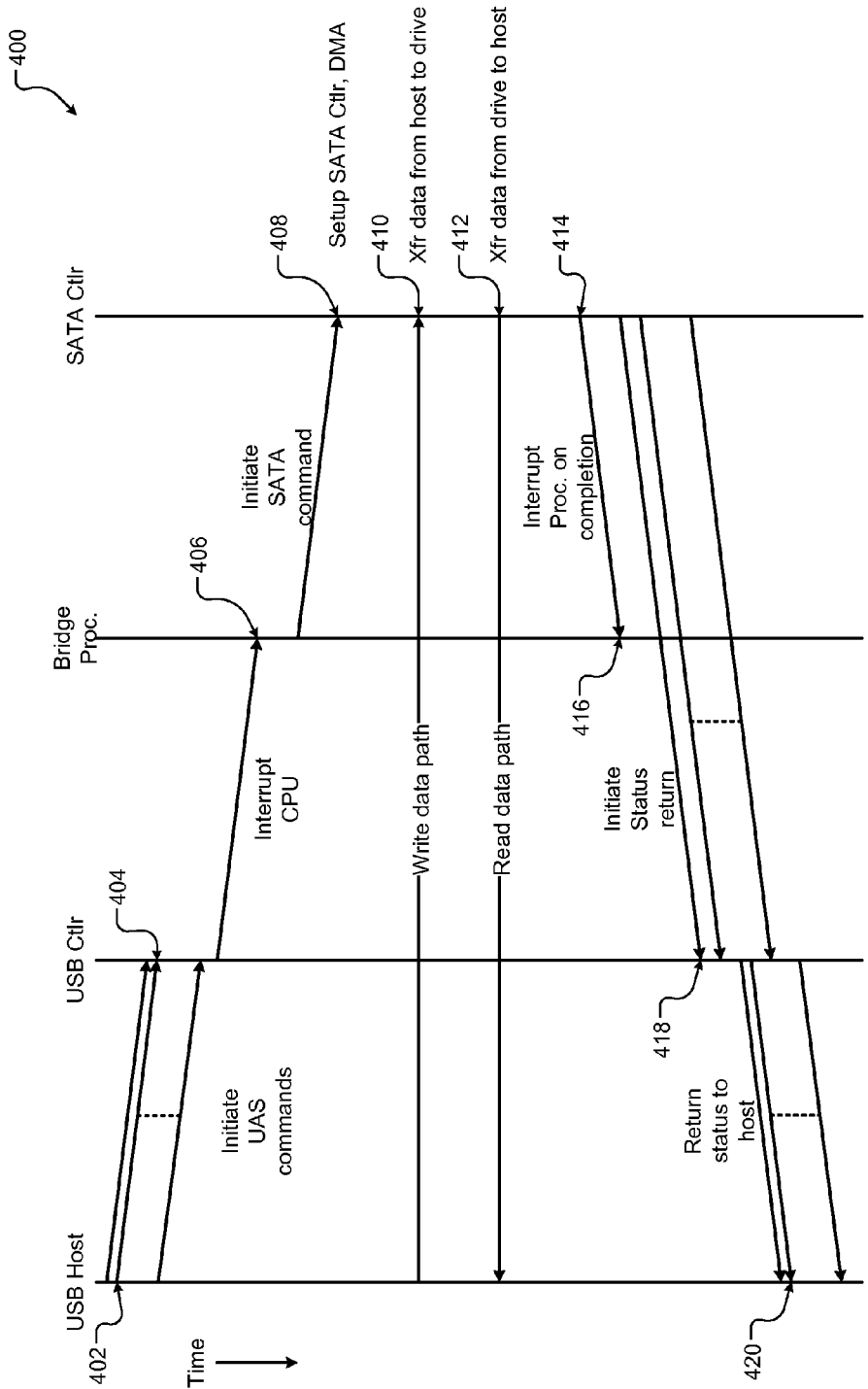
FIG. 5 depicts data flow between a host and a disk drive when the host issues a USB Attached SCSI (UAS) command.

Referring now to FIG. 5, data flows 400 for USB Attached SCSI (UAS) commands are shown. At 402, the host 14 issues USB UAS commands (e.g., a burst of up to 32 commands at a time per one SATA port). At 404, the USB controller 204 receives the USB UAS commands. The USB UAS commands are not merged together. At 406, the USB DMA module 222 or the command handling module 220 interrupts the processing module 202 (e.g., up to 32 times).

The processing module 202 converts the USB UAS commands to SATA commands (one-to-one conversion) and sends the SATA commands to the SATA controller 108 (e.g., up to 32 at a time). At 408, the SATA controller 108 receives the SATA commands (e.g., up to 32 at a time). The SATA controller 108 prepares to transfer data according to the SATA commands. The SATA controller 108 sets up one DMA operation for the data transfers (read or write operations) of all the SATA commands.

At 410, the SATA controller 108 transfers data directly from the host 14 to the disk drive 18 if the USB commands are write commands. For example, the SATA controller 108 performs up to 32 write operations (data transfers). At 412, the SATA controller 108 transfers data directly from the disk drive 18 to the host 14 if the USB commands are read commands. For example, the SATA controller 108 performs up to 32 read operations (data transfers).

At 414, the SATA controller 108 interrupts the processing module 202 when the data transfers for the SATA commands are completed (e.g., up to 32 at a time). At 416, the processing module 202 receives the interrupts (e.g., up to 32 at a time). At 418, at the same time, the SATA interface module 114 sends information directly to the status handling module 228 (e.g., up to 32 at a time). The status handling module 228 interprets the information and generates status without involvement of the processing module 202. At 420, the host 14 receives the status information (e.g., up to 32 status information at a time).

Figure 6A:
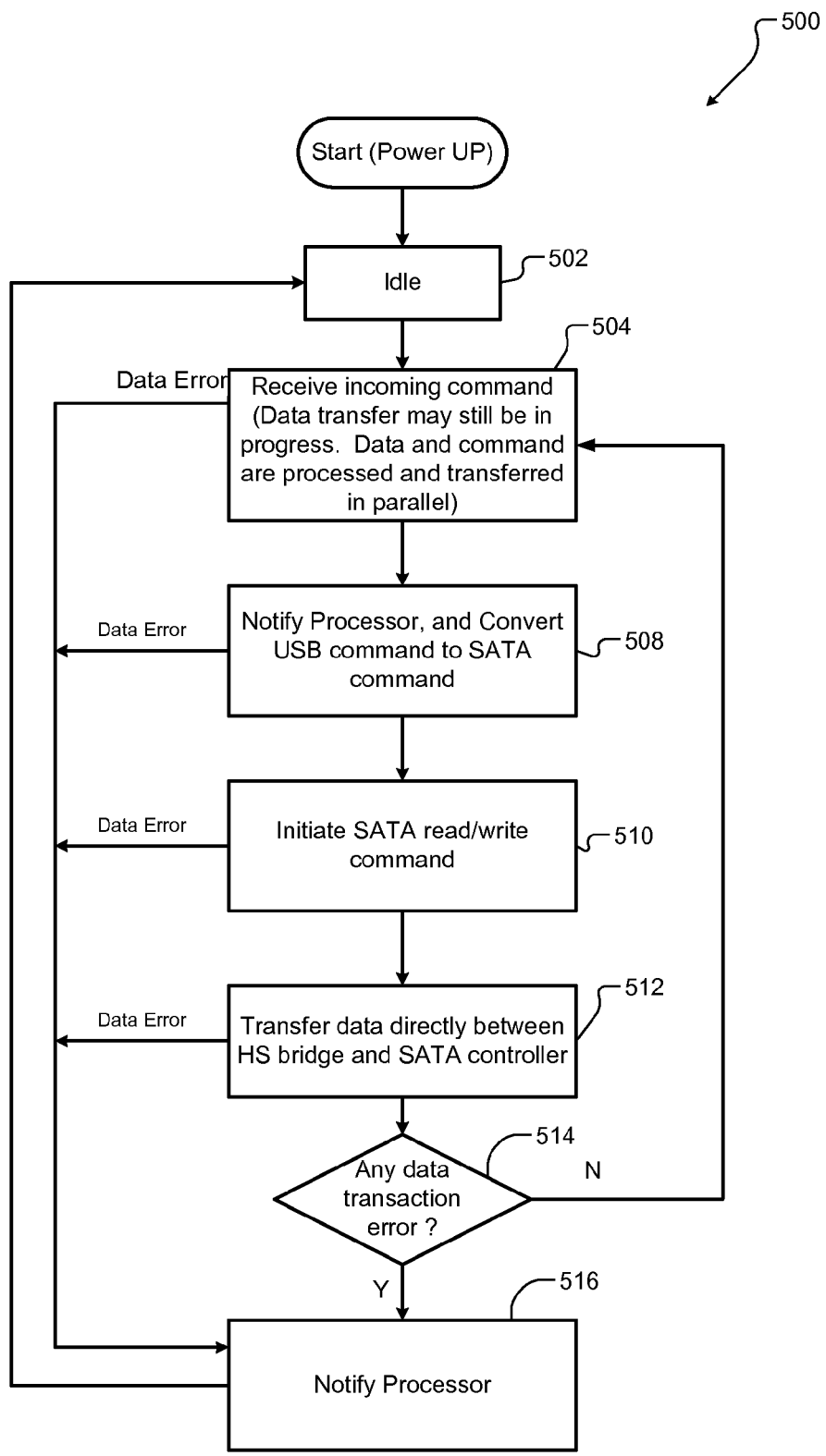
FIGS. 6A and 6B are flowcharts of methods for High-Speed bridge operations from command handling, data handling, status handling, and error handling perspectives.

Referring now to FIG. 6A, a flowchart for command handling according to the present disclosure is shown. At 502, the command handling module 220 is idle after power up. At 504, the command handling module 220 receives a USB read/write command from host 14. At 508, the command handling module 220 notifies the processing module 202, and the processing module 202 converts the received USB command to a SATA command. At 510, the processing module 202 initiates a SATA read/write operation. At 512, data is transferred directly between the high-speed bridge and the SATA controller 108. During the direct data transfer between the high-speed bridge and the SATA controller 108, if the command handling module 220 receives a next command, the command handling module 220 notifies the processing module 202, which processes the next command in parallel to the previous command for which the data is being transferred.

At 514, a determination is made if an error occurred during data transfer and/or command processing (e.g., at 504, 508, 510, and/or 512). At 516, if an error occurred during data transfer and/or command processing (e.g., at 504, 508, 510, and/or 512), the interrupt handling module 230 takes charge and notifies the processing module 202 for further instruction, and the command handling module 220 returns to the idle state.

Figure 6B:
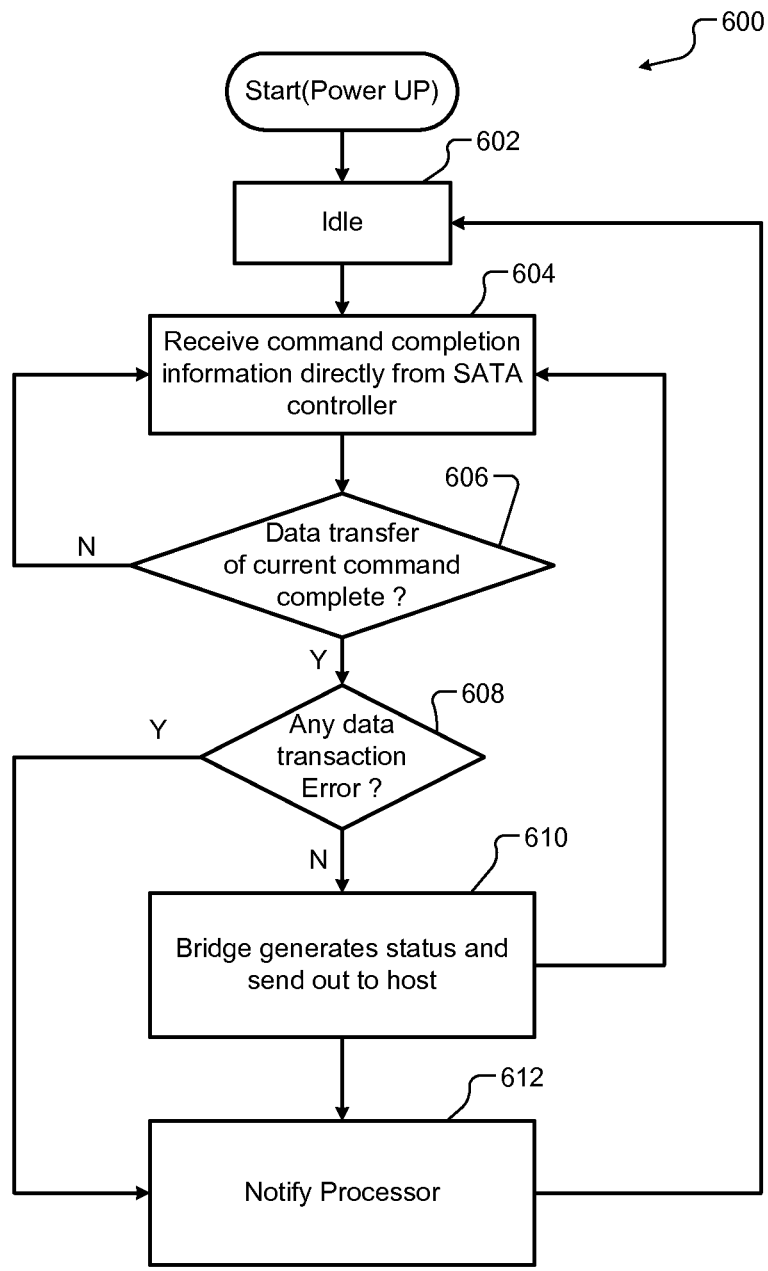

Referring now to FIG. 6B, a method 600 for status handling according to the present disclosure is shown. At 602, the status handling module 228 is idle after power on. At 604, when the SATA controller 108 completes any read/write command, the SATA controller 108 interrupts the processing module 202. At the same time, the SATA interface module 114 notifies and sends command completion information directly to the status handling module 228. At 606, a determination is made if data transfer for current command is completed. At 608, if data transfer for current command is completed, a determination is made if the data transaction is completed without error. At 610, the status handling module 228 sends out status without involvement of the processing module 202. At 612, if an error occurred in the data transaction, the interrupt handling module 230 notifies the processing module 202 for further instruction.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A system comprising:
   a controller configured to:
     communicate with a host via a first interface, and
     communicate with a storage device via a second interface,
     wherein the second interface is separate from the first interface; and
   a bridge module comprising:
     a command handling module configured to, during a command phase of data transfer between the first interface and the second interface:
       convert a first command received by the first interface from the host to a second command, and
       output the second command to the second interface,
       wherein the second interface is configured to generate a request for a data path for access to a memory of the host to transfer data between the storage device and the memory of the host according to the second command;
     a data handling module configured to, during a data phase of the data transfer between the first interface and the second interface:
       receive the request from the second interface, and
       provide the data path to the second interface to transfer the data between the storage device and the memory of the host according to the second command without buffering the data in the bridge module;
     a status handling module configured to, during a status phase of the data transfer between the first interface and the second interface:
       receive and interpret command completion information from the second interface;

generate, based on the command completion information, a status of the data transfer by determining whether the data transfer is completed without error; and
send the status of the data transfer to the host via the first interface; and
an arbitration module configured to
arbitrate bus ownership between the first interface and the second interface depending on whether the first command is a read command or a write command; and
arbitrate bus ownership between the first interface and the second interface for the command phase, the data phase, and the status phase of the data transfer according to the second command.

2. The system of claim 1, wherein:
the first interface is a Universal Serial Bus (USB) interface,
the second interface is a Serial Advanced Technology Attachment (SATA) interface,
the first command is a USB command, and
the second command is a SATA command.

3. A system-on-chip (SOC) comprising the system of claim 1.

4. The system of claim 1, wherein the second interface configured to:
transfer the data from the memory of the host to the storage device via the data path according to the second command in response to the first command being a write command to write the data to the storage device; and
transfer the data from the storage device to the memory of the host according to the second command in response to the first command being a read command to read the data from the storage device.

5. A method comprising:
communicating with a host via a first interface;
communicating with a storage device via a second interface, wherein the second interface is separate from the first interface;
communicating with the first interface and the second interface via a bridge module;
during a command phase of data transfer between the first interface and the second interface:
converting a first command received by the first interface from the host to a second command;
outputting the second command to the second interface; and
generating, from the second interface, a request for a data path for access to a memory of the host to transfer data between the storage device and the memory of the host according to the second command;
during a data phase of the data transfer between the first interface and the second interface:
receiving the request from the second interface; and
providing the data path to the second interface to transfer the data between the storage device and the memory of the host according to the second command without buffering the data in the bridge module;
during a status phase of the data transfer between the first interface and the second interface:
receiving and interpret command completion information from the second interface;
generating, based on the command completion information, a status of the data transfer by determining whether the data transfer is completed without error; and
sending the status of the data transfer to the host via the first interface;
arbitrating bus ownership between the first interface and the second interface depending on whether the first command is a read command or a write command; and
arbitrating bus ownership between the first interface and the second interface for the command phase, the data phase, and the status phase of the data transfer according to the second command.

6. The method of claim 5, wherein:
the first interface includes a Universal Serial Bus (USB) interface; and
the second interface includes a Serial Advanced Technology Attachment (SATA) interface.

7. The method of claim 5, further comprising:
transferring the data from the memory of the host to the storage device via the data path according to the second command in response to the first command being a write command to write the data to the storage device; and
transferring the data from the storage device to the memory of the host according to the second command in response to the first command being a read command to read the data from the storage device.

* * * * *